SHIFT REGISTER

Filed Jan. 31, 1952

INVENTOR
HOWARD M. FLEMING, JR.
BY William F. Glover
AGENT

Patented May 12, 1953 2,638,542

UNITED STATES PATENT OFFICE 2,638,542

SHIFT REGISTER

Howard M. Fleming, Jr., Basking Ridge, N. J., assignor to Monroe Calculating Machine Company, Orange, N. J., a corporation of Delaware Application January 31, 1952, Serial No. 269,313

11 Claims. (Cl. 250—27)

This invention relates to a new and improved electronic shift register.

Shift registers, or delay lines, are utilized in electronic computers and the like for storing items of information for variable lengths of time, for converting serial information to parallel, and for other similar purposes. In general, prior shift registers have included a series of bi-stable flip-flops so interconnected that the state of each is transferable to the next succeeding one of the series. An example of this is found in the co-pending application to W. H. Burkhart #220,846 now Patent No. 2,601,089. One method of interconnecting the flip-flops to effect such transfer involves the use of puller tubes which are permitted periodically to sense the state of one flip-flop and to set the next succeeding flip-flop accordingly. The periodic control of the pullers may be effected by timing or so-called advance pulses which are produced in synchronism with the computer or other device with which the shift register is associated. Obviously, a signal entered into the first flip-flop of the shift register is shifted or advanced one stage on the occurrence of each advance pulse.

The number of stages in a shift register is dependent upon the use for which it is designed. If it is desired to delay information 20 time periods, each equal to the interval between advance pulses, 20 stages are provided. In like manner, if it is desired to convert serial information to parallel, 20 units of information at a time, 20 stages are provided, and means are included to sense all of the stages simultaneously.

The principal object of the present invention is to provide a shift register capable of being utilized in the same manner as prior shift registers but which includes a minimum number of electronic tubes per stage.

The advantages of a shift register which includes a minimum number of tubes per stage are quite evident. A minimum number of tubes means a minimum cost and also a minimum space requirement, which in computers, particularly, is of importance. Of course, decreasing the number of tubes in a shift register also means that less power is required and that the problem of dissipating filament heat is lessened.

According to one form of the invention, a pair of triodes which may be enclosed in a single envelope constitute the tube requirements for each stage of the shift register. High and low potential input signals are applied to the grid of a first triode of each pair through an integrating circuit. The anode of this first tube of each pair is connected to a source of positive advance pulses which provide anode supply for each tube at predetermined regular intervals. The cathode of the first tube is connected through a capacitor to a source of negative potential and also to the grid of the second triode of the pair. The anode of the second tube is connected to a voltage divider adapted to produce on an output line thereof potentials substantially equal to the input potentials of the first tube but in reverse order. That is, a high signal is produced in response to the application of a low signal. The cathode of the second tube is connected to a source of negative pulses which occur or begin in coincidence with the advance pulses mentioned above.

The signals are applied to each stage of the register each in coincidence with an advance pulse, but due to the action of the integrating circuit, are not effective until the occurrence of the next advance pulse. Conduction of the first tube of a pair in response to a said signal effects charging of the condenser in the cathode circuit thereof and this maintains the second tube conducting until the occurrence of a third advance pulse. Of course, if the applied signal is such as to cut off said first tube, the second tube does not become conducting.

Other objects and features of the invention will become apparent from the following description when read in the light of the attached drawings, of which Fig. 1 is a schematic wiring diagram of three stages of a shift register constructed in accordance with the invention.

Figure 1:
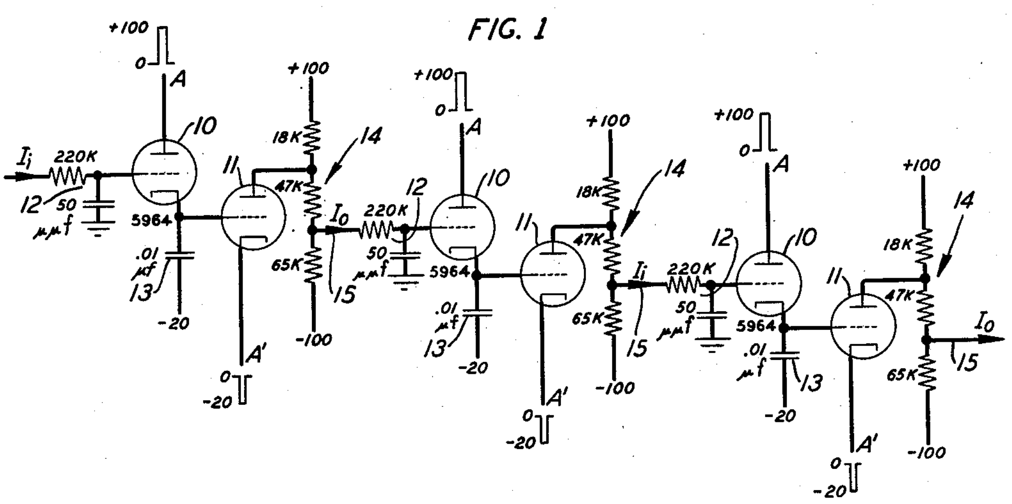
Figure 2:
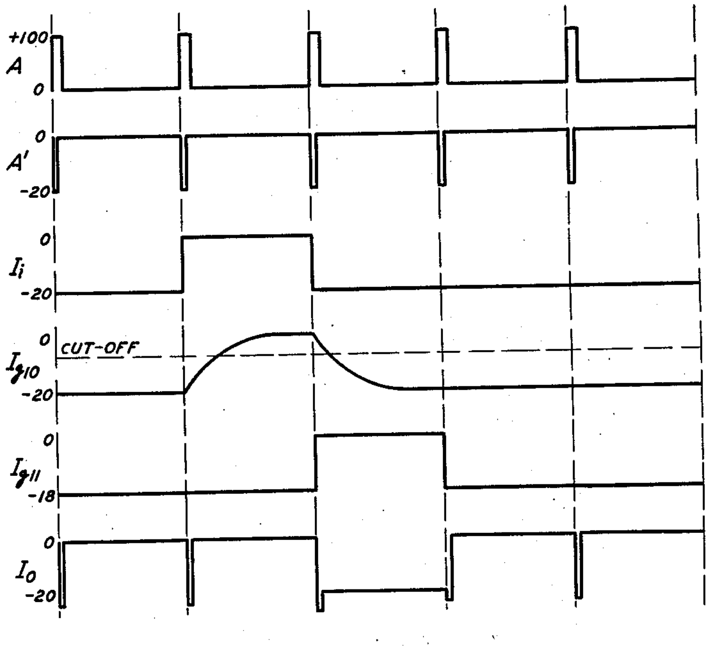
Fig. 2 is a chart illustrating the potentials at various points in the circuit at various times.

Referring to Fig. 1, each stage of the shift register of the invention includes a first triode 10 and a second triode 11. The anode of tube 10 is connected to a source of advance pulses A which are of sufficient magnitude to permit operation of the tube and which occur at regular intervals. As indicated in Fig. 2 the duration of an advance pulse is short as compared to the interval between pulses. For example, the said intervals may be 100 microseconds in length and the advance pulses less than 5 microseconds. The grid of tube 10 is connected through an integrating circuit 12 to a source of signal pulses, which, unless the tube is in the first stage of a shift register, is the preceding stage of the register. The signal pulses applied to integrator 12 of the first stage of the register are designated $I_1$ and as shown in Fig. 2, they may, for example, rise twenty volts from a minus twenty volt level. The signal pulses applied to the third, fifth, seventh, ninth, etc. odd numbered stages of the register from the preceding stages are substantially identical to those applied to the first stage and are given the same designation, $I_1$. However, the signals applied to the even numbered (2, 4, 6, 8 etc.) stages of the register are designated $I_0$ and fall twenty volts from a zero volt level. The reason for this will become apparent hereinafter. All signal pulses begin in coincidence with an advance pulse and end in coincidence with the next succeeding advance pulse. This time span between the occurrences of successive advance pulses will hereinafter be referred to as a time period, whether or not a signal pulse is present.

The cathode of tube 10 is connected through a capacitor 13 to a source of negative potential, say minus twenty volts, and also by direct coupling to the grid of tube 11. The cathode of tube 11 is connected to a source of A' pulses which may drop twenty volts from a zero volt level and which are applied or begin coincidently with the advance pulses A. Preferably, however, the A' pulses are somewhat narrower than said advance pulses A; i. e., they terminate prior to the advance pulses. The reason for this will be described hereinafter. The anode of tube 11 is connected to the juncture of the two positivemost sections of a voltage divider 14 that is applied across, for example, sources of positive and negative one hundred volt potentials. The juncture of the two negativemost sections of the divider provides a center tap from which an output line 15 is taken. In order that output line 15 may be directly connected to the input to another stage of the shift register, the values of the resistors in divider 14 are chosen to provide line 15 with potentials of zero and minus twenty volts when tube 11 is cut off and conducting respectively.

Referring now to Fig. 2, application of a signal pulse $I_1$ to an odd numbered stage of the shift register in coincidence with the application thereto of an advance pulse A is ineffective to cause conduction of tube 10 of said stage during the span of said advance pulse due to the delaying action of integrator circuit 12. As shown on the line of the chart of Fig. 2 designated $I_{g10}$, the potential at the grid of tube 10 rises from minus twenty volts to zero volts along an exponential path determined by the time constant of the integrating circuit. Preferably, said circuit is so designed that in response to a large (twenty volts) abrupt change in potential at the input thereof, only a very small, ineffective change in potential of the grid of tube 10 takes place during the span of the coincident advance pulse, and also, so that the potential at said grid reaches a value substantially identical with that at the input of the integrating circuit, namely, zero volts, prior to the occurrence of the next succeeding advance pulse.

On the occurrence of said next advance pulse, tube 10 conducts due to the high potential (zero volts) on its grid. This raises the potential of the cathode of tube 10 to approximately zero volts and tube 11 conducts. At the same time, a path of current flow is established from said cathode through the grid and cathode of tube 11 to the A' pulse source which at the time assumes a potential of minus twenty volts. Of course, charging of condenser 13 is also effected. As mentioned above, the A' pulses are somewhat narrower than the advance pulses A and terminate before the latter. During this period in which the advance pulse is maintaining tube 10 conductive after the removal of the A' pulse from the cathode of tube 11, the current path from the cathode of tube 10 is to the condenser 13 and full charging of the latter is ensured. Meanwhile, the approximately zero volt potential on the grid of tube 11 maintains the latter conducting. After the termination of the advance pulse the charge on condenser 13 maintains the grid of tube 11 at, or sufficiently close to zero volt potential to uphold conduction of the tube until the next advance pulse.

Therefore, the signal $I_0$ on output line 15 to the next stage of the shift register during the time period under consideration is an inverted image of signal $I_1$ which was applied to integrator 12 during the preceding time period.

The even numbered stages of the shift register to which the $I_0$ signals are applied, function as follows. Application of a negatively directed signal $I_0$ to the integrator 12 in a said stage in synchronism with an advance pulse A is ineffective to cut off the tube 10 of the stage during said advance pulse due to the action of the integrator. However, on the occurrence of the next advance pulse, tube 10 is prevented from conducting and whatever charge remains in condenser 13 is discharged through the grid cathode path of tube 11 to the minus twenty volt source. Thus tube 11 in said stage is not maintained conductive and the output $I_1$ of its divider 14 is high (zero volts) for the duration of the time period following that in which the signal $I_0$ was applied to the stage. Of course, on each application of an A' pulse the tube 11 conducts momentarily. It is to be mentioned that the modes of operation of the several odd-even stages are reversed when no signals $I_1$ or $I_0$ are applied thereto. That is, an odd numbered stage with no signal applied functions as an even numbered stage with a signal applied etc.

Figure 3:
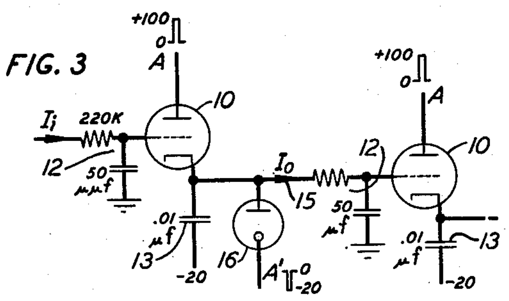
Fig. 3 is a schematic wiring diagram of a shift register stage constructed in accordance with a modified form of the invention.

Referring to Fig. 2, it will be noted that the potential at the grid of tube 11 of each stage during any time period is almost equal to that applied to the integrator 12 of the stage during the preceding time period. The loss sustained between the two points is due to the less-than-unity amplification factor of the cathode-follower-connected tube 10. If the tubes 11 and their voltage dividers 14 were not provided to counterbalance these losses in the several tubes 10, said losses would mount up from stage to stage until eventually the signal delivered to a stage would not be sufficient to effect the proper control thereon. In some instances wherein only a few stages are required for the job at hand, the tubes 11 and their voltage dividers 14 may not be provided, but rather, as indicated in Fig. 3, the cathode of each tube 10 may be connected directly to the integrator 12 of the next stage. In this arrangement, a discharge path from each condenser 13 to the source of the A' pulses may be provided through a diode 16. If desired, the last stage may be provided with a tube 11 and a voltage divider 14 to produce output signals of the same values as the input signals to the first stage. Of course, the number of stages which can be connected in this fashion is limited by the amount of loss in each stage and the overall loss which can be sustained without causing a misoperation in the final stage.

It will be seen therefore, that there has been provided a shift register adapted to be utilized in the same manner as prior shift registers, but which requires a minimum number of tubes per stage.

The circuit parameters, indicated in the drawing are merely shown by way of example, the invention not being limited thereto except as indicated by specific references in the description.

While there has been above described but a limited number of embodiments of the invention, it is to be understood that many changes may be made therein without departing from the spirit of the invention and it is not desired, therefore, to limit the invention except as pointed out in the appended claims or as dictated by the prior art.

I claim:

1. In a shift register stage, a pair of electron tubes each having an anode, a cathode and a control grid, an integrating circuit through which signals of one or the other of two given potentials are applied to the control grid of a first tube of the pair, a source of negative potential to which the cathode of the first tube is connected, a condenser between said source and said cathode, a direct coupling from said cathode to the control grid of the second tube of the pair, a voltage divider connected to the anode of the second tube and having a center tap which assumes one of said two given potentials when the opposite one thereof is applied to the grid of the first tube, the anode of the first tube having applied thereto at regular intervals in synchronism with the application of said signals to the integrating circuit positive pulses which are of short duration as compared to said intervals and to the time constant of the integrating circuit, the cathode of the second tube having negative pulses applied thereto in synchronism with said positive pulses, and said condenser being such as when charged, to maintain said second tube conducting for a said interval.

2. The combination of means for producing, at regular intervals, synchronized positive and negative pulses which are of short duration as compared to a said interval, a first electron tube having an anode to which the positive pulses are applied, a control grid to which signals of one or the other of two predetermined potentials are applied, and a cathode; an integrating circuit for said grid having a time constant which is large with respect to a said pulse and to which said signals are applied in synchronism with said pulses, a condenser, a source of negative potential to which said cathode is connected through said condenser, a second electron tube having a control grid directly coupled to said cathode and maintained above cutoff potential by said condenser for a said interval following each conduction of the first tube, a cathode to which said negative pulses are applied, and an anode; and a voltage divider to which the last said anode is connected and which has a center tap that assumes the opposite one of said two potentials to that which is applied to the control grid of the first tube.

3. A shift register stage comprising means for supplying at regular intervals synchronized positive and negative pulses which are of short duration as compared to the intervals between pulses, a pair of triodes of which a first has the positive pulses applied to its anode and the second has the negative pulses applied to its cathode, an integrating circuit connected to the grid of the first triode and having a time constant which is large with respect to the duration of a said pulse, signals for controlling said first triode being applied to said integrating circuit in synchronism with the application of said pulses, a source of negative potential, a direct coupling between the cathode of the first triode and the grid of the second, a condenser connecting said cathode with said source, and adapted, when charged, to maintain the grid of the second triode at a potential above cutoff for a said interval between pulses, and a voltage divider to which the anode of the second triode is connected and which develops predetermined potentials at a center tap thereof.

4. A shift register comprising in each of a plurality of stages a pair of triodes of which one has its cathode directly coupled to the grid of the second, means for applying positive pulses to the anode of said one triode and negative pulses applied to the cathode of the other, said pulses occurring in synchronism at regular intervals and being of short duration as compared to the intervals between pulses, an integrating circuit connected to the grid of the first triode and having a time constant which is large with respect to the duration of a said pulse, signals of one or the other of two potentials being applied to said integrating circuit in synchronism with the application of said pulses, a source of negative potential, a condenser connecting the cathode of the first triode with said source and adapted, when charged, to maintain the grid of the second triode at a potential above cut-off for a said interval between pulses, and a voltage divider to which the anode of the second triode is connected and which develops at a center tap thereof, the opposite one of said two potentials to that which is applied to the grid of the first triode.

5. The combination according to claim 4, wherein the center tap of the voltage divider of each of said plurality of stages is directly coupled to the integrating circuit of the next stage.

6. A shift register comprising in each of a plurality of stages a pair of vacuum tubes each having at least a cathode, a control grid and an anode, and of which one has its cathode directly coupled to the grid of the second, means for applying positive pulses to the anode of said one triode and negative pulses to the cathode of the other, said pulses occurring in synchronism at regular intervals and being of short duration as compared to the intervals between pulses, an integrating circuit connected to the grid of the first tube and having a time constant which is large with respect to the duration of a said pulse, signals of one or the other of two potentials being applied to said integrating circuit in synchronism with the application of said pulses, a source of negative potential, a condenser connecting the cathode of the first tube with said source and adapted, when charged, to maintain the grid of the second tube at a potential above cutoff for a said interval between pulses, and a voltage divider to which the anode of the second tube is connected and which develops at a center tap thereof, the opposite one of said two potentials to that which is applied to the grid of the first tube.

7. The combination according to claim 6 wherein the center tap of the voltage divider of each of said plurality of stages is directly coupled to the integrating circuit of the next stage.

8. The combination with means for producing, at regular intervals, positive and negative pulses which are of short duration as compared to a said interval, of a shift register comprising in each of a plurality of stages a cathode follower including an anode to which said positive pulses are applied, a grid and a cathode, an integrating circuit having a time constant which is large with respect to the duration of a said pulse connected to the said grid, a source of negative supply, a condenser connected between said cathode and said source and charged on conduction of the cathode follower, means connected to said cathode and enabled by said negative pulses for discharging said condenser, and connections between said cathode and the integrating circuit of the next succeeding stage of the shift register, controlled by said condenser, said condenser being adapted to maintain substantially a full charge for an entire said interval.

9. The combination according to claim 8 wherein said discharging means comprises a diode to which said negative pulses are applied, and said connections comprise a conductor.

10. The combination according to claim 8 wherein said discharging means and said connections comprise a triode having said negative pulses applied to its cathode and having its grid connected to the cathode of the cathode follower, and a voltage divider to which the anode of said triode is connected, said divider having a center tap connected to the integrating circuit in the next stage of the shift register.

11. The combination according to claim 8 wherein in each of said plurality of stages save the last said discharging means comprises a diode to which said negative pulses are applied and said connections comprise a conductor, and wherein in said last stage said discharging means and said connections comprise a triode having said negative pulses applied to its cathode and having its grid connected to the cathode of the cathode follower, and a voltage divider connected to the anode of the triode, said voltage divider having a center tap connected to the integrating circuit of the next stage of the shift register.

HOWARD M. FLEMING, Jr.

References Cited in the file of this patent

UNITED STATES PATENTS

| Number | Name | Date |
| --- | --- | --- |
| 2,601,089 | Burkhart | June 17, 1952 |
| 2,603,746 | Burkhart et al. | July 15, 1952 |